United States Patent
Steinmetz et al.

(10) Patent No.: US 10,501,574 B2
(45) Date of Patent: *Dec. 10, 2019

(54) DIMER FATTY ACID-POLYETHER-REACTION PRODUCT AND COATING COMPOSITION COMPRISING THE REACTION PRODUCT

(71) Applicant: BASF Coatings GmbH, Muenster (DE)

(72) Inventors: Bernhard Steinmetz, Ruetschenhausen (DE); Peter Hoffmann, Senden (DE); Hardy Reuter, Muenster (DE)

(73) Assignee: BASF Coatings GmbH, Muenster (DE)

( * ) Notice: Subject to any disclaimer, the term of this patent is extended or adjusted under 35 U.S.C. 154(b) by 313 days.

This patent is subject to a terminal disclaimer.

(21) Appl. No.: 14/913,141

(22) PCT Filed: Jul. 17, 2014

(86) PCT No.: PCT/EP2014/065442
§ 371 (c)(1),
(2) Date: Feb. 19, 2016

(87) PCT Pub. No.: WO2015/028197
PCT Pub. Date: Mar. 5, 2015

(65) Prior Publication Data
US 2016/0200863 A1   Jul. 14, 2016

(30) Foreign Application Priority Data
Aug. 27, 2013   (EP) .................................... 13181764

(51) Int. Cl.
| | | |
|---|---|---|
| *C09D 167/02* | (2006.01) | |
| *C08G 18/48* | (2006.01) | |
| *C09D 171/02* | (2006.01) | |
| *C08G 65/332* | (2006.01) | |
| *C08G 63/676* | (2006.01) | |
| *C09D 151/08* | (2006.01) | |
| *C09D 175/04* | (2006.01) | |

(52) U.S. Cl.
CPC ....... *C08G 63/676* (2013.01); *C08G 18/4891* (2013.01); *C08G 65/3322* (2013.01); *C09D 151/08* (2013.01); *C09D 167/025* (2013.01); *C09D 171/02* (2013.01); *C09D 175/04* (2013.01)

(58) Field of Classification Search
CPC .............. C08G 18/4891; C08G 63/676; C08G 65/3322; C09D 151/08; C09D 167/025; C09D 171/02; C09D 175/04
See application file for complete search history.

(56) References Cited

U.S. PATENT DOCUMENTS

| | | | |
|---|---|---|---|
| 4,324,734 A | 4/1982 | Rehm et al. | |
| 6,632,915 B1 | 10/2003 | Schwarte et al. | |
| 2004/0076758 A1 | 4/2004 | Lettmann et al. | |
| 2008/0199604 A1 | 8/2008 | Lettmann et al. | |
| 2010/0311939 A1 | 12/2010 | Bigorra Llosas et al. | |
| 2012/0309994 A1 | 12/2012 | Bigorra Llosas et al. | |
| 2014/0065428 A1* | 3/2014 | Hoffmann ............ | C09D 175/04 428/423.1 |
| 2016/0200936 A1* | 7/2016 | Steinmetz ............ | C08G 63/553 428/480 |
| 2017/0158906 A1* | 6/2017 | Steinmetz ................ | C09D 5/44 |

FOREIGN PATENT DOCUMENTS

| | | |
|---|---|---|
| DE | 40 09 858 A1 | 10/1991 |
| DE | 44 37 535 A1 | 4/1996 |
| DE | 199 14 896 A1 | 10/2000 |
| DE | 199 30 665 A1 | 1/2001 |
| DE | 199 48 004 A1 | 7/2001 |
| DE | 100 43 405 C1 | 6/2002 |
| EP | 0 228 003 A1 | 7/1987 |
| EP | 0 521 928 B1 | 8/1994 |
| EP | 0 634 431 A1 | 1/1995 |
| EP | 1 990 355 A1 | 11/2008 |
| JP | 2007-45776 A | 2/2007 |
| WO | 92/15405 A1 | 9/1992 |
| WO | WO 02/44233 A1 | 6/2002 |

OTHER PUBLICATIONS

International Preliminary Report on Patentability and Written Opinion dated Mar. 10, 2016 in PCT/EP2014/065442 filed Jul. 17, 2014 (English translation only).
International Search Report dated Aug. 5, 2014, in PCT/EP2014/065442 filed Jul. 17, 2014.

* cited by examiner

*Primary Examiner* — Ling Siu Choi
*Assistant Examiner* — Gennadiy Mesh
(74) *Attorney, Agent, or Firm* — Oblon, McClelland, Maier & Neustadt, L.L.P.

(57) ABSTRACT

A dimer fatty acid-polyether-reaction product prepared by reacting a composition containing at least 80 wt % of one or more dimer fatty acids with at least one polyether of application formula (I) in a molar ratio of 0.7/2.3 to 1.6/1.7. The reaction product has a number-average molecular weight of 4800 to 40000 g/mol and an acid number of less than 10 mg KOH/g.

16 Claims, No Drawings

DIMER FATTY ACID-POLYETHER-REACTION PRODUCT AND COATING COMPOSITION COMPRISING THE REACTION PRODUCT

The invention relates to an innovative dimer fatty acid-polyether-reaction product. It further relates to a pigmented aqueous basecoat material which comprises this polymer, and also to the use of said polymer in pigmented aqueous basecoat materials. It also relates to a method for producing multicoat paint systems, using the pigmented aqueous basecoat material, and also to the multicoat paint systems producible by means of said method. The present invention relates, furthermore, to the refinishing of defects on multicoat paint systems.

PRIOR ART

A multiplicity of methods are known for producing multicoat color and/or effect paint systems. Known from the prior art (compare, for example, German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) is, for example, the following method, in which
 (1) a pigmented aqueous basecoat material is applied to a substrate,
 (2) a polymer film is formed from the coating material applied in stage (1),
 (3) a clearcoat material is applied to the resulting basecoat film, and subsequently
 (4) the basecoat film is cured together with the clearcoat film.

This method is widely employed, for example, for the OEM finishing of automobiles and also for the painting of metal and plastic ancillary components. Under certain conditions, adhesion problems arise here, particularly between basecoat film and clearcoat film. The method is also used, furthermore, for the refinishing of automobile bodies. This refers both to OEM automobile refinishing and also to the automotive refinishing which takes place, for example, in a workshop. Particularly problematic in this context is the adhesion between the original finish and the basecoat used in the finishing, or the coating film produced from it. The properties of a basecoat material and of the coating films produced from it are determined in particular by the binders and additives present in the basecoat material, examples being specific reaction products.

Problem

The problem addressed by the present invention, therefore, was that of providing a reaction product which can be used to produce coatings which no longer have the above-identified disadvantages of the prior art. The adhesion of coatings, especially basecoat films, ought therefore to be improved significantly both when painting metallic and plastic substrates and when carrying out automotive refinishing. In the painting of metallic and plastic substrates, the foreground was occupied, as well as by the adhesion of the basecoat to the substrate, by the adhesion between basecoat and clearcoat. In the case of automotive refinishing, the foreground was occupied, as well as by the adhesion between basecoat and clearcoat, by the adhesion between basecoat and original finish. This ought to be improved in particular for use in OEM automobile refinishing. In particular, therefore, the intention, through the provision of a new reaction product and the use thereof in coating compositions, especially pigmented basecoat materials, was to improve the adhesion of these basecoat materials to the respective interfaces within the nexus of coats in multicoat paint systems.

The adhesion problems affecting the systems known from the prior art may in particular be especially pronounced when the coated substrates are exposed to weathering. It is a further object of the present invention, therefore, to provide coatings which even after having been exposed to weathering still possess outstanding adhesion properties.

Poor adhesion is manifested, in the case of exposure to weathering, in the incidence of blisters and swelling in particular. A central problem addressed by the present invention, accordingly, was that of reducing, or even entirely preventing, the incidence of blisters and swelling after weathering exposures.

Solution

The problems identified have been solved by a dimer fatty acid-polyether-reaction product which is preparable by reacting
 (a) dimer fatty acids with
 (b) at least one polyether of the general structural formula (I)

$$(I)$$

where R is a $C_3$ to $C_6$ alkylene radical and n correspondingly is selected such that the polyether (b) possesses a number-average molecular weight of 2250 to 6000 g/mol, components (a) and (b) are used in a molar ratio of 0.7/2.3 to 1.6/1.7, and the resulting reaction product possesses a number-average molecular weight of 4800 to 40000 g/mol and an acid number of less than 10 mg KOH/g.

The condition that n is selected such that said polyether possesses a number-average molecular weight of 2250 to 6000 g/mol may be illustrated as follows. Where, for example, R is a hexamethylene radical and the number-average molecular weight is to be 3000 g/mol, n is on average between 29 and 30. From the provisos given, the skilled person is perfectly well aware of how to prepare or select a corresponding reaction product. Apart from this, the description which follows on below, and especially the examples, provide additional information as well. The parameter n, then, just like the number-average molecular weight, is to be understood as a statistical average value.

The new reaction product is also referred to below as reaction product of the invention. Preferred embodiments of the reaction product of the invention are apparent from the description which follows and also from the dependent claims.

Likewise provided by the present invention is a pigmented aqueous basecoat material comprising the reaction product of the invention, and the use of the reaction product in aqueous basecoat materials for improving adhesion. The present invention relates not least to a method for producing a multicoat paint system on a substrate, and also to a multicoat paint system produced by said method. The present invention also relates to a method for refinishing defects on multicoat paint systems, wherein the basecoat of the invention is used.

The reaction product of the invention produces outstanding adhesion between basecoat materials or basecoat films which comprise the reaction product, and the underlying substrate, and also the clearcoat situated above. A further factor, moreover, is that outstanding adhesion in particular is achieved to original finishes, and to original finishes with defects, it being possible for these defects to have been abraded where appropriate. Particularly effective is the minimization of typical phenomena which indicate deficient adhesion, especially blisters and swelling in the respective paint system. Aside from the sector of original finishing, particularly the sector of the automobile industry, the reaction product of the invention and also the basecoat material of the invention can therefore be used to particularly good effect in the sector of automotive refinish.

Component (a)

The reaction product of the invention is prepared using at least one dimer fatty acid (a).

Dimer fatty acids (also long known as dimerized fatty acids or dimer acids) are generally, and especially in the context of the present invention, mixtures prepared by oligomerization of unsaturated fatty acids. They are preparable, for example, by catalytic dimerization of unsaturated plant fatty acids, with starting materials used more particularly being unsaturated $C_{12}$ to $C_{22}$ fatty acids. Linkage is primarily in accordance with the Diels-Alder type, and the result, depending on the number and position of the double bonds in the fatty acids used for preparing the dimer fatty acids, are mixtures of principally dimeric products, which have cycloaliphatic, linear aliphatic, branched aliphatic, and also $C_6$ aromatic hydrocarbon groups between the carboxyl groups. Depending on mechanism and/or optionally subsequent hydrogenation, the aliphatic radicals may be saturated or unsaturated and the fraction of aromatic groups as well may vary. The radicals between the carboxylic acid groups then contain, for example, 24 to 44 carbon atoms. For the preparation, fatty acids having 18 carbon atoms are preferably used, and so the dimeric product has 36 carbon atoms. The radicals which join the carboxyl groups of the dimer fatty acids preferably have no unsaturated bonds and no aromatic hydrocarbon radicals.

For the purposes of the present invention, then, $C_{18}$ fatty acids are used preferably in the preparation. Particular preference is given to the use of linolenic, linoleic and/or oleic acid.

Depending on the reaction regime, the above-identified oligomerization produces mixtures comprising primarily dimeric molecules, but also trimeric molecules and monomeric molecules and other byproducts. Purification commonly takes place distillatively. Commercial dimer fatty acids generally contain at least 80 wt % of dimeric molecules, up to 19 wt % of trimeric molecules, and not more than 1 wt % of monomeric molecules and of other byproducts.

Preference is given to using dimer fatty acids which consist of at least 90 wt %, preferably at least 95 wt %, very preferably at least 98 wt % of dimeric fatty acid molecules.

For the purposes of the present invention, preference is given to using dimer fatty acids which consist of at least 90 wt % of dimeric molecules, less than 5 wt % of trimeric molecules, and less than 5 wt % of monomeric molecules and other byproducts. Particular preference is given to the use of dimer fatty acids which consist of 95 to 98 wt % of dimeric molecules, less than 5 wt % of trimeric molecules, and less than 1 wt % of monomeric molecules and of other byproducts. Likewise used with particular preference are dimer fatty acids consisting of at least 98 wt % of dimeric molecules, less than 1.5 wt % of trimeric molecules, and less than 0.5 wt % of monomeric molecules and other byproducts. Determining the fractions of monomeric, dimeric, and trimeric molecules and of other byproducts in the dimer fatty acids may be done for example by means of gas chromatography (GC). In that case, prior to the GC analysis, the dimer fatty acids are converted to the corresponding methyl esters via the boron trifluoride method (compare DIN EN ISO 5509) and then analyzed by means of GC.

A fundamental identifier of "dimer fatty acids" in the context of the present invention, therefore, is that their preparation involves the oligomerization of unsaturated fatty acids. The principal products of this oligomerization, in other words to an extent preferably of at least 80 wt %, more preferably of at least 90 wt %, very preferably of at least 95 wt %, and more particularly of at least 98 wt %, are dimeric products. The fact that the oligomerization thus produces predominantly dimeric products, which contain precisely two fatty acid molecules, justifies this designation, which is in any case commonplace. An alternative expression for the relevant term "dimer fatty acids", therefore, is "mixture comprising dimerized fatty acids".

The dimer fatty acids to be used can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from Cognis, and Unidyme 10 and Unidyme TI from Arizona Chemical.

Component (b)

The component (b) which is used is at least one polyether of the general structural formula (I)

(I)

where R is a $C_3$ to $C_6$ alkyl radical. The index n is to be selected in each case such that said polyether possesses a number-average molecular weight of 2250 to 6000 g/mol. It preferably possesses a number-average molecular weight of 2300 to 5600 g/mol, more preferably of 2400 to 5200 g/mol, and more particularly of 2500 to 4800 g/mol, and very particularly preferably 2700 to 4700 g/mol. Unless specifically indicated otherwise, the number-average molecular weight for the purposes of the present invention is determined by means of vapor pressure osmosis. Measurement took place using a vapor pressure osmometer (model 10.00 from Knauer) on concentration series of the component under investigation in toluene at 50° C., with benzophenone as calibration substance for the determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

It is known that the number-average molecular weight is always a statistical average value. The same, then, must also be true of the parameter n as per formula (I). The term polyether which is chosen for the component (b) and is to be elucidated in this context is understood as follows. Polymers, for example polyethers (b), always comprise mixtures of molecules with different sizes. At least a portion, or all, of these molecules are distinguished by a sequence of identical or different monomer units (as a reacted form of monomers). The polymer or molecule mixture therefore in principle comprises molecules which comprise a plurality of (that is, at least two) identical or different monomer units. It will be appreciated that in the mixture there may also, proportionally, be the monomers themselves, in other words in their unreacted form. This is the reason alone, as is known, for the preparation reaction that is polymerization of monomers—that in general does not proceed with molecular uniformity. Whereas a defined monomer can be assigned a discrete molecular weight, a polymer, therefore, is always a mixture of molecules which differ in their molecular weights. A polymer therefore cannot be described by a discrete molecular weight, but instead, as is known, is always assigned average molecular weights, such as the number-average molecular weight specified above, for example.

In the polyether for use in accordance with the invention it is possible for all n radicals R to be identical. It is likewise also possible, however, for different kinds of radicals R to be present. Preferably all the radicals R are identical.

R preferably is a $C_3$ or $C_4$ alkylene radical. With particular preference it is an isopropylene radical or a tetramethylene radical.

With very particular preference, the polyether for use in accordance with the invention is polypropylene glycol or polytetrahydrofuran.

The Reaction Product

There are no peculiarities to the preparation of the reaction product of the invention. Components (a) and (b) are linked to one another via common-knowledge esterification. Accordingly, the carboxyl groups of component (a) are reacted with the hydroxyl groups of component (b). The reaction may take place, for example, in bulk or in solution with typical organic solvents at temperatures of, for example, 50° C. to 300° C. It is of course also possible for typical catalysts to be employed, such as sulfuric acid, sulfonic acids and/or tetraalkyl titanates, zinc alkoxylates and/or tin alkoxylates, dialkyltin oxides such as di-n-butyltin oxide, for example, or organic salts of the dialkyltin oxides. Customarily a water separator is used as well, to collect the water produced during the condensation reaction.

The components (a) and (b) here are used in a molar ratio of 0.7/2.3 to 1.6/1.7, preferably of 0.8/2.2 to 1.6/1.8, and very preferably of 0.9/2.1 to 1.5/1.8. The reaction is discontinued when the reaction product of the invention possesses an acid number of less than 10 mg KOH/g. Preferably it possesses an acid number of less than 7.5 mg KOH/g, and very preferably of less than 5 mg KOH/g. The acid number is determined in accordance with DIN 53402.

The resulting reaction product possesses a number-average molecular weight of 4800 to 40000 g/mol, preferably 5000 to 30000 g/mol, very preferably 5500 to 20000 g/mol and in particular 6000 to 12000 g/mol.

The reaction products of the invention generally possess a low water-solubility. If used in aqueous systems, they generally accumulate at the interfaces, owing to their incompatibility, for example, and are therefore able to contribute to improving the adhesion with respect to adjoining films.

The reaction product of the invention is generally hydroxy-functional, preferably dihydroxy-functional.

Particularly preferred embodiments are specified below.

a) In one particularly preferred embodiment of the reaction product of the invention, the dimer fatty acid is prepared from linolenic, linoleic and/or oleic acid and consists of at least 98 wt % of dimeric molecules, less than 1.5 wt % of trimeric molecules, and less than 0.5 wt % of monomeric molecules and other byproducts.

b) In another particularly preferred embodiment of the reaction product of the invention, the polyether for use in accordance with the invention is polypropylene glycol or polytetrahydrofuran and it also possesses a number-average molecular weight of 2500 to 4800 g/mol.

c) In another particularly preferred embodiment of the reaction product of the invention, the components (a) and (b) are used in a molar ratio of 0.9/2.1 to 1.5/1.8.

d) In another particularly preferred embodiment of the reaction product of the invention, said product possesses an acid number of less than 5 mg KOH/g.

e) In another particularly preferred embodiment of the reaction product of the invention, said product possesses a number-average molecular weight of 6000 to 12000 g/mol.

In one especially preferred embodiment of the reaction product of the invention, all of the features indicated under a) to e) are realized in combination.

The Pigmented Aqueous Basecoat Material

The present invention further relates to a pigmented aqueous basecoat material which comprises at least one reaction product of the invention.

A basecoat material is a color-imparting intermediate coating material that is used in automotive finishing and general industrial painting. This basecoat material is generally applied to a metallic or plastics substrate which has been pretreated with surfacer or primer-surfacer, or else, occasionally, directly to the plastics substrate. Substrates used may also include existing paint systems, which may optionally require pretreatment as well (by abrading, for example). It is presently entirely customary to apply more than one basecoat film. Accordingly, in such a case, a first basecoat film represents the substrate for a second such film. To protect a basecoat film from environmental effects in particular, at least one additional clearcoat film is applied over it.

The sum total of the weight-percentage fractions, based on the total weight of the pigmented aqueous basecoat material, of all reaction products of the invention is preferably 0.1 to 30 wt %, more preferably 1 to 20 wt %, and very preferably 1.5 to 15 wt % or even 2 to 12 wt %.

Where the amount of reaction product of the invention is below 0.1 wt %, it may be possible that no improvement in adhesion is obtained any longer. Where the amount is more than 30 wt %, there may in certain circumstances be disadvantages, such as incompatibility of said reaction product in the basecoat material, for example. Such incompatibility may be manifested, for example, in uneven leveling and also in floating or settling.

As already described above, the reaction product of the invention is generally of poor solubility in aqueous systems. It is therefore preferably used directly during the production of the pigmented aqueous basecoat material, and not only added to the otherwise complete basecoat material after production has taken place.

In one preferred embodiment the sum total of the weight-percentage fractions of all reaction products of the invention is 0.1 to 30 wt %, based on the total weight of the pigmented aqueous basecoat material. Where preferred embodiments of the reaction products of the invention are employed, the sum total of the weight-percentage fractions of all preferred embodiments of the reaction products of the invention is preferably likewise 0.1 to 30 wt %, based on the total weight of the pigmented aqueous basecoat material. With particular preference the pigmented aqueous basecoat material comprises, as reaction products of the invention, exclusively preferred embodiments of the reaction products of the invention.

In one preferred embodiment, the sum total of the weight-percentage fractions of all reaction products of the invention is 1 to 20 wt %, based on the total weight of the pigmented aqueous basecoat material. Where preferred embodiments of the reaction products of the invention are employed, the sum total of the weight-percentage fractions of all preferred embodiments of the reaction products of the invention is preferably likewise 1 to 20 wt %, based on the total weight of the pigmented aqueous basecoat material. With particular preference the pigmented aqueous basecoat material comprises, as reaction products of the invention, exclusively preferred embodiments of the reaction products of the invention.

In one especially preferred embodiment, the sum total of the weight-percentage fractions of all reaction products of the invention is 1.5 to 15 wt %, based on the total weight of the pigmented aqueous basecoat material. Where preferred embodiments of the reaction products of the invention are employed, the sum total of the weight-percentage fractions of all preferred embodiments of the reaction products of the invention is preferably likewise 1.5 to 15 wt %, based on the total weight of the pigmented aqueous basecoat material. With particular preference the pigmented aqueous basecoat material comprises, as reaction products of the invention, exclusively preferred embodiments of the reaction products of the invention.

In a likewise especially preferred embodiment, the sum total of the weight-percentage fractions of all reaction products of the invention is 2 to 12 wt %, based on the total weight of the pigmented aqueous basecoat material. Where preferred embodiments of the reaction products of the invention are employed, the sum total of the weight-percentage fractions of all preferred embodiments of the reaction products of the invention is preferably likewise 2 to 12 wt %, based on the total weight of the pigmented aqueous basecoat material. With particular preference the pigmented aqueous basecoat material comprises, as reaction products of the invention, exclusively preferred embodiments of the reaction products of the invention.

As examples of embodiments of the reaction products of the invention that are preferred in this sense, mention may be made of the following particularly preferred embodiments:

a) In one particularly preferred embodiment of the reaction product of the invention, the dimer fatty acid is prepared from linolenic, linoleic and/or oleic acid and consists of at least 98 wt % of dimeric molecules, less than 1.5 wt % of trimeric molecules, and less than 0.5 wt % of monomeric molecules and other byproducts.

b) In another particularly preferred embodiment of the reaction product of the invention, the polyether for use in accordance with the invention is polypropylene glycol or polytetrahydrofuran and it also possesses a number-average molecular weight of 2500 to 4800 g/mol.

c) In another particularly preferred embodiment of the reaction product of the invention, components (a) and (b) are used in a molar ratio of 0.9/2.1 to 1.5/1.8.

d) In another particularly preferred embodiment of the reaction product of the invention, said product possesses an acid number of <5 mg KOH/g.

e) In another particularly preferred embodiment of the reaction product of the invention, said product possesses a number-average molecular weight of 6000 to 12000 g/mol.

As a further example of embodiments of the reaction products of the invention that are preferred in this sense, mention may be made of those which realize all of the features specified under a) to e), in combination.

The basecoat materials used in accordance with the invention comprise color and/or effect pigments. Such color pigments and effect pigments are known to the skilled person and are described for example in Rompp-Lexikon Lacke and Druckfarben, Georg Thieme Verlag, Stuttgart, N.Y., 1998, pages 176 and 451. The fraction of the pigments may be situated for example in the range from 1 to 40 wt %, preferably 2 to 30 wt %, more preferably 3 to 25 wt %, based on the total weight of the pigmented aqueous basecoat material.

Preferred basecoat materials in the context of the present invention are those which comprise, as binders, polymers curable physically, thermally, or both thermally and with actinic radiation. Binder for the purposes of the present invention and in accordance with relevant DIN EN ISO 4618 is the nonvolatile fraction of a coating composition, without pigments and fillers. Specific binders, accordingly, include, for example, typical coatings additives, the reaction product of the invention, or typical crosslinking agents described later on below, even if the expression is used primarily below in relation to particular polymers curable physically, thermally, or both thermally and with actinic radiation, as for example particular polyurethane resins.

Besides the reaction product of the invention, the pigmented aqueous basecoat materials of the invention more preferably comprise at least one polyurethane resin as binder. Coating materials of this kind comprising polyurethane resins may likewise customarily be cured physically, thermally, or both thermally and with actinic radiation.

For the purposes of the present invention, the term "physical curing" denotes the formation of a film by loss of solvent from polymer solutions or polymer dispersions. Typically no crosslinking agents are necessary for this curing.

For the purposes of the present invention, the term "thermal curing" denotes the heat-initiated crosslinking of a coating film, with either a separate crosslinking agent or else self-crosslinking binders being employed in the parent coating material. The crosslinking agent comprises reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7, line 28 to page 9, line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators.

Where thermal curing and curing with actinic light are employed in unison, the term "dual cure" is also used.

In the present invention preference is given both to basecoat materials which cure physically and to basecoat materials which cure thermally or both thermally and with actinic radiation, i.e., by "dual cure".

Preferred thermally curing basecoat materials are those which comprise as binder a polyurethane resin, preferably a hydroxyl-containing polyurethane resin, and as crosslinking agent an aminoplast resin or a blocked or nonblocked polyisocyanate, preferably an aminoplast resin. Among the aminoplast resins, melamine resins are preferred.

The sum total of the weight-percentage fractions, based on the total weight of the pigmented aqueous basecoat material, of all crosslinking agents, preferably aminoplast resins and/or blocked and/or nonblocked polyisocyanates, more particularly preferably melamine resins, is preferably 1 to 20 wt %, more preferably 1.5 to 17.5 wt %, and very preferably 2 to 15 wt % or even 2.5 to 10 wt %.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin may be present alongside the polymer originating from the polymerization of the olefinically unsaturated monomers, without these polymers being bonded covalently to one another. Equally, however, the polyurethane resin may also be bonded covalently to the polymer originating from the polymerization of the olefinically unsaturated monomers. The olefinically unsaturated monomers are preferably monomers containing acrylate groups and/or methacrylate groups. It is likewise preferred for the monomers containing acrylate and/or methacrylate groups to be used in combination with other olefinically unsaturated compounds which contain no acrylate or methacrylate groups. Olefinically unsaturated monomers attached to the polyurethane resin are more preferably monomers containing acrylate groups or methacrylate groups, thereby producing polyurethane (meth)acrylates. Very preferably the polyurethane resin is a polyurethane (meth)acrylate. The polyurethane resin present with preference is curable physically, thermally, or both thermally and with actinic radiation. More particularly it is curable either thermally or both thermally and with actinic radiation. With particular preference the polyurethane resin comprises reactive functional groups through which external crosslinking is possible.

Suitable saturated or unsaturated polyurethane resins are described for example in
German patent application DE 199 14 896 A1, column 1, lines 29 to 49 and column 4, line 23 to column 11, line 5,
German patent application DE 199 48 004 A1, page 4, line 19 to page 13, line 48,
European patent application EP 0 228 003 A1, page 3, line 24 to page 5, line 40,
European patent application EP 0 634 431 A1, page 3, line 38 to page 8, line 9, or
international patent application WO 92/15405, page 2, line 35 to page 10, line 32.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of high molecular mass are saturated or olefinically unsaturated polyester polyols and/or polyether polyols. High molecular mass polyols are more particularly polyester polyols, especially those having a number-average molecular weight of 400 to 5000 g/mol.

For hydrophilic stabilization and/or for increasing the dispersibility in aqueous medium, the polyurethane resin preferably present may contain particular ionic groups and/or groups which can be converted into ionic groups (potentially ionic groups). Polyurethane resins of this kind are referred to for the purposes of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted into cations by neutralizing agents and/or quaternizing agents, and/or cationic groups (cationic modification)

or functional groups which can be converted into anions by neutralizing agents, and/or anionic groups (anionic modification)

and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which, by neutralizing agents and/or quaternizing agents, can be converted into cationic groups). Also deserving of mention are the cationic groups—groups prepared from the aforementioned functional groups using neutralizing agents and/or quaternizing agents that are known to the skilled person—such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic acid, sulfonic acid and/or phosphonic acid groups, more particularly carboxylic acid groups (functional groups which, by neutralizing agents, can be converted into anionic groups), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced for example through the incorporation of poly(ethylene) oxide polymers as lateral or terminal groups of the polyurethane molecules. The hydrophilic modifications are introduced, for example, via compounds which contain at least one group that is reactive toward isocyanate groups—preferably at least one hydroxyl group. To introduce the ionic modification it is possible to use monomers which as well as the modifying groups contain at least one hydroxyl group. To introduce the nonionic modifications, preference is given to using the polyetherdiols and/or alkoxypoly(oxyalkylene) alcohols that are known to the skilled person.

The polyurethane resin may preferably be a graft polymer. More particularly it is a polyurethane resin grafted with olefinically unsaturated compounds, preferably olefinically unsaturated monomers. In this case, then, the polyurethane is grafted, for example, with side groups and/or side chains that are based on olefinically unsaturated monomers. These are more particularly side chains based on poly(meth)acrylates. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to be side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion. In this case the polyurethane resin present in the primary dispersion may contain lateral and/or terminal olefinically unsaturated groups via which, then, the graft polymerization with the olefinically unsaturated compounds proceeds. The polyurethane resin for grafting may therefore be an unsaturated polyurethane resin (A). The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane resin. This attachment takes place instead of or in addition to the radical reaction of the olefinically unsaturated compounds with the lateral and/or terminal olefinically unsaturated groups optionally present in the polyurethane resin. This is then followed again by the graft polymerization via radical polymerization, as described earlier on above. The result in any case is polyurethane resins grafted with olefinically unsaturated compounds, preferably olefinically unsaturated monomers.

As olefinically unsaturated compounds with which the polyurethane resin (A) is preferably grafted it is possible to use virtually all radically polymerizable, olefinically unsaturated, and organic monomers which are available to the skilled person for these purposes. A number of preferred monomer classes may be specified by way of example:

Hydroxyalkyl esters of (meth)acrylic acid or of other alpha, beta-ethylenically unsaturated carboxylic acids,
(meth)acrylic acid alkyl and/or cycloalkyl esters having up to 20 carbon atoms in the alkyl radical,
ethylenically unsaturated monomers comprising at least one acid group, more particularly exactly one carboxyl group, such as (meth)acrylic acid, for example,
vinyl esters of monocarboxylic acids which are branched in alpha-position and have 5 to 18 carbon atoms,
reaction products of (meth)acrylic acid with the glycidyl ester of a monocarboxylic acid which is branched in alpha-position and has 5 to 18 carbon atoms,
further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth)acrylate groups, and so the side chains attached by grafting are poly(meth)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in additional to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polymerization of polyisocyanates and polyols to polyurethanes, and the graft polymerization that preferably then follows with olefinically unsaturated compounds. The methods are known to the skilled person and can be adapted individually. Exemplary preparation processes and reaction conditions can be found in European patent EP 0521 928 B1, page 2, line 57 to page 8, line 16.

The polyurethane resin preferably present preferably possesses a number-average molecular weight of 200 to 30 000 g/mol, more preferably of 2000 to 20 000 g/mol. It further possesses, for example, a hydroxyl number of to 250 mg KOH/g, but more particularly from 20 to 150 mg KOH/g. The acid number of the polyurethane resin is preferably 5 to 200 mg KOH/g, more particularly 10 to 40 mg KOH/g. The hydroxyl number is determined for the purposes of the present invention in accordance with DIN 53240, the acid number in accordance with DIN 53402.

The polyurethane resin content is preferably between 5 and 80 wt %, more preferably between 8 and 70 wt %, and very preferably between 10 and 60 wt %, based in each case on the film-forming solids of the basecoat material.

By film-forming solids, corresponding ultimately to the binder fraction, is meant the nonvolatile weight fraction of the basecoat material, without pigment and, where appropriate, fillers. The film-forming solids can be determined as follows: A sample of the pigmented aqueous basecoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried at 120° C. for two hours and the resulting film-forming solids is obtained by weighing.

The sum total of the weight-percentage fractions, based on the total weight of the pigmented aqueous basecoat material, of all polyurethane resins is preferably 2 to 40 wt %, more preferably 2.5 to 30 wt %, and very preferably 3 to 20 wt %.

The pigmented aqueous basecoat material to be used may further comprise at least one polyester different from the reaction products of the invention, more particularly a polyester having a number-average molecular weight of 400 to 5000 g/mol, as binder. Such polyesters are described for example in DE 4009858 in column 6, line 53 to column 7, line 61 and column 10, line 24 to column 13, line 3.

There is preferably also a thickener present. Suitable thickeners are inorganic thickeners from the group of the phyllosilicates. Besides the inorganic thickeners, however, there may also be one or more organic thickeners used. These are preferably selected from the group consisting of (meth)acrylic acid-(meth)acrylate copolymer thickeners, such as the commercial product Rheovis AS 5130 (BASF), and of polyurethane thickeners, such as the commercial product Rheovis PU 1250 (BASF), for example. The thickeners used are different from the binders used.

Furthermore, the pigmented aqueous basecoat material may further comprise at least one adjuvant. Examples of such adjuvants are salts which can be decomposed thermally without residue or substantially without residue, binder resins different from polyurethane resins and curable physically, thermally and/or with actinic radiation, further cross-linking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, radical polymerization initiators, adhesion promoters, leveling agents, film-forming assistants, sag control agents (SCAs), flame retardants, corrosion inhibitors, waxes, siccatives, biocides, and flatting agents.

Suitable adjuvants of the aforementioned kind are known for example from

German patent application DE 199 48 004 A1, page 14, line 4, to page 17, line 5, German patent DE 100 43 405 C1, column 5, paragraphs [0031] to [0033].

They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few rangefinding tests.

The solids content of the basecoat materials is preferably 5 to 70 wt %, more preferably 8 to 60 wt %, and very preferably 12 to 55 wt %.

By solids content (nonvolatile fraction) is meant that weight fraction which remains as a residue on evaporation under specified conditions. In the present specification, the solids are determined in accordance with DIN EN ISO 3251. This is done by evaporating the basecoat material at 130° C. for 60 minutes.

Unless indicated otherwise, this test method is likewise employed in order to determine, for example, the fraction of various components of the basecoat material as a proportion of the total weight of the basecoat material. Thus, for example, the solids of a dispersion of a polyurethane resin which is to be added to the basecoat material may be determined correspondingly in order to ascertain the fraction of this polyurethane resin as a proportion of the overall composition.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents instead, in contrast, including a significant fraction of water as solvent. "Aqueous" for the purposes of the present invention should preferably be understood to mean that the coating material in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn the water fraction is 40 to 90 wt %, more particularly 50 to 80 wt %, very preferably 60 to 75 wt %, based in each case on the total amount of solvents present.

The basecoat materials employed in accordance with the invention may be produced using the mixing assemblies and mixing techniques that are customary and known for producing basecoat materials.

The Method of the Invention and the Multicoat Paint System of the Invention

A further aspect of the present invention is a method for producing a multicoat paint system, where (1) a pigmented aqueous basecoat material is applied to a substrate,
(2) a polymer film is formed from the coating material applied in stage (1),
(3) a clearcoat material is applied to the resulting basecoat film, and subsequently
(4) the basecoat film is cured together with the clearcoat film, which comprises using in stage (1) a pigmented aqueous basecoat material which comprises at least one reaction product of the invention. All of the above observations relating to the reaction product of the invention and to the pigmented aqueous basecoat material are also valid in respect of the method of the invention. This is true more particularly also of all preferred, very preferred, and especially preferred features.

Said method is employed preferably for producing multicoat color paint systems, effect paint systems, and color and effect paint systems.

The pigmented aqueous basecoat material used in accordance with the invention is commonly applied to metallic or plastics substrates that have been pretreated with surfacer or primer-surfacer. Said basecoat material may also be applied, optionally, directly to the plastics substrate.

Where a metallic substrate is to be coated, it is preferably further coated with an electrocoat system before the surfacer or primer-surfacer is applied.

Where a plastic substrate is being coated, it is preferably also pretreated before the surfacer or primer-surfacer is applied. The techniques most frequently employed for such pretreatment are those of flaming, plasma treatment, and corona discharge. Flaming is used with preference.

The pigmented aqueous basecoat material of the invention may be applied to a metallic substrate, at the film thicknesses customary within the automobile industry, in the range, for example, of 5 to 100 micrometers, preferably 5 to 60 micrometers. This is done using spray application methods, such as, for example, compressed air spraying, airless spraying, high-speed rotation, electrostatic spray application (ESTA), alone or in conjunction with hot spray application such as hot air spraying, for example.

Following the application of the pigmented aqueous basecoat material, it can be dried by known methods. For example, 1K (1-component) basecoat materials, which are preferred, can be flashed at room temperature for 1 to 60 minutes and subsequently dried, preferably at optionally slightly elevated temperatures of 30 to 90° C. Flashing and drying for the purposes of the present invention mean the evaporation of organic solvents and/or water, as a result of which the paint becomes dryer but has not yet cured or not yet formed a fully crosslinked coating film.

Then a commercial clearcoat material is applied, by likewise common methods, the film thicknesses again being situated in the customary ranges, 5 to 100 micrometers for example.

After the clearcoat material has been applied, it can be flashed at room temperature for 1 to 60 minutes, for example, and optionally dried. The clearcoat is then cured together with the applied pigmented basecoat. In the course of these procedures, crosslinking reactions occur, for example, to produce on a substrate a multiple-coat color and/or effect paint system of the invention. Curing takes place preferably thermally at temperatures from 60 to 200° C. Thermally curing basecoat materials are preferably those which comprise as additional binder a polyurethane resin and as crosslinking agent an aminoplast resin or a blocked or nonblocked polyisocyanate, preferably an aminoplast resin. Among the aminoplast resins, melamine resins are preferred.

The coating of plastics substrates takes place basically in the same way as that of metallic substrates. Here, however, in general, curing takes place at significantly lower temperatures, of 30 to 90° C. Preference is therefore given to the use of two-component clearcoat materials. Preference is further given to use of basecoat materials which comprise a polyurethane resin as binder, but no crosslinker.

The method of the invention can be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted a second time, likewise by means of the method of the invention.

The invention relates further to multicoat paint systems which are producible by the method described above. These multicoat paint systems are to be referred to below as multicoat paint systems of the invention.

All of the observations above in respect of the reaction product of the invention, the pigmented aqueous basecoat material, and the method of the invention also apply correspondingly in respect of said multicoat paint system. This is true especially also of all preferred, more preferred, and very preferred features.

The multicoat paint systems of the invention are preferably multicoat color paint systems, effect paint systems, and color and effect paint systems.

A further aspect of the invention relates to the method of the invention, said substrate from stage (1) comprising a multicoat paint system which possesses defects. This substrate/multicoat paint system, which possesses defects, is therefore an original finish, which is to be repaired or completely recoated.

The method of the invention is suitable accordingly for repairing defects on multicoat paint systems. Defects or film defects are, generally speaking, disturbances on and in the coating, named usually according to their shape or their appearance. The skilled person is aware of a host of possible kinds of such film defects. They are described for example in Römpp-Lexikon Lacke and Druckfarben, Georg Thieme Verlag, Stuttgart, N.Y., 1998, page 235, "Film defects".

The multicoat paint systems produced by means of the method of the invention may likewise have such defects.

In one preferred embodiment of the method of the invention, therefore, the substrate from stage (1) is a multicoat paint system of the invention which exhibits defects.

These multicoat paint systems are produced preferably on automobile bodies or parts thereof, by means of the method of the invention, identified above, in the context of automotive OEM finishing. Where such defects occur directly after OEM finishing has taken place, they are repaired immediately. The term "OEM automotive refinishing" is therefore also used. Where only small defects require repair, only the "spot" is repaired, and the entire body is not completely recoated (dual coating). The latter process is called "spot repair". The use of the method of the invention for remedying defects on multicoat paint systems (original finishes) of the invention in OEM automobile refinishing, therefore, is particularly preferred.

Where reference is made, in the context of the present invention, to the automotive refinish segment, in other words when the repair of defects is the topic, and the substrate specified is a multicoat paint system possessing defects, this of course means that this substrate/multicoat paint system with defects (original finish) is generally located on a plastic substrate or on a metallic substrate as described above.

So that the repaired site has no color difference from the rest of the original finish, it is preferred for the aqueous basecoat material used in stage (1) of the method of the invention for repairing defects to be the same as that which was used to produce the substrate/multicoat paint system with defects (original finish).

The observations above concerning the polymer of the invention and the aqueous pigmented basecoat material therefore are also valid for the use, under discussion, of the method of the invention for repairing defects on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defects on the multicoat paint system of the invention can be repaired by means of the above-described method of the invention. For this purpose, the surface to be repaired on the multicoat paint system may initially be abraded. The abrading is preferably performed by partially sanding, or sanding off, only the basecoat and the clearcoat from the original finish, but not sanding off the primer layer and surfacer layer that are generally situated beneath them. In this way, during the refinish, there is no need in particular for renewed application of specialty primers and primer-surfacers. This form of abrading has become established especially in the OEM automobile refinishing segment, since here, in contrast to refinishing in a workshop, generally speaking, defects occur only in the basecoat and/or clearcoat region, but do not, in particular, occur in the region of the underlying surfacer and primer coats. Defects in the latter coats are more likely to be encountered in the workshop refinish sector. Examples include paint damage such as scratches, which are produced, for example, by mechanical effects and which often extend down to the substrate surface (metallic or plastic substrate).

After the abrading procedure, the pigmented aqueous basecoat material is applied to the defect site in the original finish by pneumatic atomization. After the pigmented aqueous basecoat material has been applied, it can be dried by known methods. For example, the basecoat material may be dried at room temperature for to 60 minutes and subsequently dried at optionally slightly elevated temperatures of 30 to 80° C. Flashing and drying for the purposes of the present invention means evaporation of organic solvents and/or water, whereby the coating material is as yet not fully cured.

For the purposes of the present invention it is preferred for the basecoat material to comprise a polyurethane resin as binder and an aminoplast resin, preferably a melamine resin, as crosslinking agent.

A commercial clearcoat material is subsequently applied, by techniques that are likewise commonplace. Following application of the clearcoat material, it may be flashed at room temperature for 1 to 60 minutes, for example, and optionally dried. The clearcoat is then cured together with the applied pigmented basecoat.

In the case of so-called low-temperature baking, curing takes place preferably at temperatures of 20 to 90° C. Preference here is given to using two-component clearcoat materials. If, as described above, a polyurethane resin is used as further binder and an aminoplast resin is used as crosslinking agent, there is only slight crosslinking by the aminoplast resin in the basecoat film at these temperatures. Here, in addition to its function as a curing agent, the aminoplast resin also serves for plasticizing and may assist pigment wetting. Besides the aminoplast resins, nonblocked isocyanates may also be used. Depending on the nature of the isocyanate used, they crosslink at temperatures from as low as 20° C.

In the case of so-called low-temperature baking, curing takes place preferably at temperatures of 130 to 150° C. Here, both one-component and two-component clearcoat materials are used. If, as described above, a polyurethane resin is used as further binder and an aminoplast resin is used as crosslinking agent, there is crosslinking by the aminoplast resin in the basecoat film at these temperatures.

For repairing defects on multicoat paint systems, in other words when the substrate is an original finish with defects, preferably a multicoat paint system of the invention that exhibits defects, the low-temperature baking is preferably employed.

A further aspect of the present invention is the use of the reaction product of the invention in pigmented aqueous basecoat materials for improving adhesion. This should be understood as improving adhesion relative to pigmented aqueous basecoat materials which do not comprise a reaction product of the invention.

The reaction product of the invention can be used for improving adhesion in the coating of metallic and plastic substrates. It can also be used in automotive refinishing. By automotive refinishing is meant not only OEM automotive refinishing but also the automotive refinishing which takes place, for example, in a workshop.

Where said pigmented aqueous basecoat materials are used in the coating of metallic and plastic substrates, the use of the reaction product of the invention leads in particular to an improvement in the adhesion between the basecoat film and the clearcoat film directly adjoining it. The reaction product of the invention is therefore used preferably for improving adhesion between basecoat film and clearcoat film in the coating of metallic substrates and plastic substrates.

Where said pigmented aqueous basecoat materials are used in automotive refinish, the use of the reaction product of the invention leads in particular to an improvement in adhesion between basecoat and original finish. The reaction product of the invention is therefore likewise used preferably for improving the adhesion between basecoat film and original finish in automotive refinish, more preferably in OEM automotive refinish.

The adhesion problems in the case of prior-art systems are especially striking when the coated substrates are exposed to weathering. Weathering conditions of this kind can be simulated by what is called condensation-water storage. The term "condensation-water storage" denotes the storage of coated substrates in a climate chamber in accordance with CH test conditions according to DIN EN ISO 6270 2:2005-09.

The reaction products of the invention are therefore also used in particular in order to improve the adhesion following condensation-water storage. The adhesion is investigated preferably by means of a steam jet test according to test method A of DIN 55662:2009-12.

When coated substrates are exposed to weathering, poor adhesion is also manifested in particular in the occurrence of blisters and swelling. The reaction products of the invention are therefore also used in particular to prevent or reduce the incidence of blisters and swelling in multicoat paint systems. The presence of blisters and swelling in this context may be appraised visually.

The invention is illustrated below using examples.

EXAMPLES

Specification of Particular Components and Measurement Methods

Dimer Fatty Acid:

The dimer fatty acid used contains less than 1.5 wt % trimeric molecules, 98 wt % dimeric molecules, and less than 0.3 wt % fatty acid (monomer). It is prepared on the basis of linolenic, linoleic, and oleic acids (Pripol™ 1012-LQ-(GD) (from Croda)).

Polyester 1 (P1):

Prepared as per example D, column 16, lines 37 to 59 of DE 4009858 A. The corresponding polyester solution has a solids content of 60 wt %, the solvent used being butyl glycol rather than butanol, so the solvents present are primarily butyl glycol and water.

Determination of the Number-Average Molecular Weight:

The number-average molecular weight was determined by means of vapor pressure osmosis. Measurement took place using a vapor pressure osmometer (model 10.00 from Knauer) on concentration series of the component under investigation in toluene at 50° C., with benzophenone as calibration substance for the determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

Preparation of an Inventive Reaction Product (IR1):

In a 4 l stainless-steel reactor, equipped with anchor stirrer, thermometer, condenser, thermometer for overhead temperature measurement, and water separator, 861.8 g of linear diolic PolyTHF3000 with an OH number of 37.4 mg KOH/g (0.2873 mol), 83.2 g of dimer fatty acid (0.1436 mol), and 29.3 g of xylene were heated to 100° C. in the presence of 0.8 g of di-n-butyltin oxide (Axion® CS 2455, from Chemtura). Heating was continued slowly until the onset of the condensation. With a maximum overhead temperature of 85° C., heating was then continued in steps up to 200° C. The progress of the reaction was monitored via determination of the acid number. When an acid number of ≤1.5 mg KOH/g was reached, xylene still present was removed by vacuum distillation. After 24 hours, this gave a polymer which is solid at room temperature. Gas chromatography found a xylene content of less than 0.1%.

Amount of condensate (water): 6.2 g
Acid number: 0.6 mg KOH/g
Solids content (GC): 100.0%
Number-average molecular weight: 6450 g/mol
Viscosity (resin:xylene=2:1): 2330 mPas, (measured at 23° C. using a rotational viscometer from Brookfield, model CAP 2000+, spindle 3, shear rate: 10 000 s$^{-1}$)

Production of Aqueous Basecoat Materials
Production of a Silver Comparative Waterborne Basecoat 1 (C1)

The components listed under "aqueous phase" in table A were stirred together in the order stated to give an aqueous mixture. In the next step an organic mixture was prepared from the components listed under "organic phase". The organic mixture was added to the aqueous mixture. The combined mixtures was then stirred for 10 minutes and adjusted using deionized water and dimethylethanolamine to a pH of 8 and to a spray viscosity of 58 mPas under a shearing load of 1000 s$^{-1}$, as measured using a rotational viscometer (Rheomat RM 180 instrument from Mettler-Toledo) at 23° C.

TABLE A

| Component | Parts by weight |
|---|---|
| Aqueous phase | |
| 3% strength Na Mg phyllosilicate solution | 26 |
| Deionized water | 13.6 |
| Butyl glycol | 2.8 |
| Polyurethane-modifed polyacrylate; prepared as per page 7, line 55 to page 8, line 23 of DE 4437535 A | 4.5 |
| 50% strength by weight solution of Rheovis PU 1250 (BASF), rheological agent | 0.6 |
| P1 | 3.2 |
| Tensid S (BASF surfactant) | 0.3 |
| Melamine-formaldehyde resin (Cymel 203 from Cytec) | 4.1 |
| 10% strength dimethylethanolamine in water | 0.3 |
| Polyurethane-based graft copolymer; prepared as per page 19, line 44 to page 20, line 21 of DE 19948004 A | 20.4 |
| Tensid S (BASF surfactant) | 1.6 |
| 3% strength by weight aqueous Rheovis AS S130 solution; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Production of an Inventive Waterborne Basecoat Material

To produce the inventive waterborne basecoat material I1, a paint was produced as for the production of the comparative waterborne basecoat 1 (C1), using IR1, instead of the polyester P1, both in the aqueous phase and in the organic phase. IR1 was used here as an 80% strength solution in butyl glycol. Based on the solids fraction (nonvolatile fraction), the amount of IR1 used in I1 was the same as that of the polyester P1 used in C1. The different amounts of butyl glycol resulting from the different solids of dispersions P1 and IR1 were compensated in the formulation I1 by corresponding addition of butyl glycol.

Table 1 shows again the polyesters and reaction products, and their proportions (based on the total amount of the waterborne basecoat materials), used in waterborne basecoat materials C1 and I1, as an overview.

TABLE 1

Compositions of waterborne basecoat materials (WBM) C1 and I1

| WBM | [wt %] | polyester/reaction product |
|---|---|---|
| C1 | 4.92 | P1 |
| I1 | 4.92 | IR1 |

Production of Multicoat Paint Systems and Performance Investigation of the Multicoat Paint Systems For determining the stability with respect to the incidence of blisters and swelling after condensation-water storage, multicoat paint systems were produced in accordance with the following general instructions.

A steel panel coated with a standard cathodic electrocoat (Cathoguard® 800 from BASF Coatings GmbH) and with dimensions of 10×20 cm was coated with a standard surfacer (ALG 670173—surfacer, medium-gray, from Hemmelrath). After preliminary drying of the aqueous surfacer at 80° C. over a period of 10 minutes, the surfacer was baked at a temperature of 190° C. over a period of 30 minutes.

The respective waterborne basecoat material from table 1 was then applied pneumatically. The resulting waterborne basecoat film was flashed at room temperature for 2 minutes and subsequently dried in a forced-air oven at 70° C. for 10 minutes. A customary two-component clearcoat material (Progloss® 345 from BASF Coatings GmbH) was applied to the dried waterborne basecoat film. The resulting clearcoat film was flashed at room temperature for 20 minutes. The waterborne basecoat film and the clearcoat film were then cured in a forced-air oven at 160° C. for 30 minutes. The present system represents an overbaked original system and will be referred to below as the original finish.

This original finish is abraded with abrasive paper and then the respective waterborne basecoat material from table 1 is applied pneumatically to this abraded original finish. The resulting waterborne basecoat film was flashed at room temperature for 2 minutes and subsequently dried in a forced-air oven at 70° C. for 10 minutes. A so-called 80° C. two-component clearcoat material (FF230500 2K refinish clearcoat, scratchproof, from BASF Coatings GmbH) was applied to the dried waterborne basecoat film. The resulting clearcoat film was flashed at room temperature for 20 minutes. The waterborne basecoat film and the clearcoat film were then cured in a forced-air oven at 80° C. for 30 minutes.

The steel panels thus treated were then stored over a period of 10 days in a conditioning chamber under CH test conditions according to DIN EN ISO 6270 2:2005-09. 24 hours after removal from the conditioning chamber, the panels were then inspected for blistering and swelling.

The occurrence of blisters was assessed as follows through a combination of 2 values:

The number of blisters was evaluated by a quantitative figure from 1 to 5, with m1 denoting very few and m5 very many blisters.

The size of the blisters was evaluated by a size figure again from 1 to 5, with g1 denoting very small and g5 very large blisters.

The designation m0g0 denotes, accordingly, a paint system which was blister-free after condensation-water storage, and in terms of blistering represents a "satisfactory" result.

Table 2 shows the corresponding results for waterborne basecoat materials C1 and I1.

TABLE 2

Blistering and swelling of multicoat paint systems produced using waterborne basecoat materials C1 and I1

| WBM | Blistering | Swelling | Evaluation |
| --- | --- | --- | --- |
| C1 | m5g1 | none | unsat |
| I1 | m0g0 | none | sat |

Key:
m = number of blisters
g = size of blisters
sat = satisfactory result
unsat = unsatisfactory result The results confirm that when using the reaction products of the invention, blisters no longer occur after condensation-water exposure, and instances of swelling are no longer visible.

Production of a Silver Comparative Waterborne Basecoat 2 (C2)

The components listed under "aqueous phase" in table B were stirred together in the order stated to form an aqueous mixture. In the next step an organic mixture was prepared from the components listed under "organic phase". The organic mixture was added to the aqueous mixture. The combined mixtures was then stirred for 10 minutes and adjusted using deionized water and dimethylethanolamine to a pH of 8 and to a spray viscosity of 58 mPas under a shearing load of 1000 s$^{-1}$ as measured using a rotational viscometer (Rheomat RM 180 instrument from Mettler-Toledo) at 23° C.

TABLE B

| Component | Parts by weight |
| --- | --- |
| Aqueous phase | |
| 3% strength Na Mg phyllosilicate solution | 26 |
| Deionized water | 21.7 |
| Butyl glycol | 2.8 |
| Polyurethane-modified polyacrylate; prepared as per page 7, line 55 to page 8, line 23 of DE 4437535 A | 4.5 |
| 50% strength by weight solution of Rheovis PU 1250 (BASF), rheological agent | 0.6 |
| P1 | 13.3 |
| Tensid S (BASF surfactant) | 0.3 |
| Melamine-formaldehyde resin (Cymel 203 from Cytec) | 4.1 |
| 10% strength dimethylethanolamine in water | 0.3 |

TABLE B-continued

| Component | Parts by weight |
| --- | --- |
| Polyurethane-based graft copolymer; prepared as per page 19, line 44 to page 20, line 21 of DE 19948004 A | 1.8 |
| Tensid S (BASF surfactant) | 1.6 |
| 3% strength by weight aqueous Rheovis AS S130 solution; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Production of an Inventive Waterborne Basecoat Material 2 (I2)

To produce the inventive waterborne basecoat material I2, a paint was produced as for the production of the comparative waterborne basecoat 2 (C2), using IR1, instead of the polyester P1, both in the aqueous phase and in the organic phase. IR1 was used here as an 80% strength solution in butyl glycol. Based on the solids fraction (nonvolatile fraction), the amount of IR1 used in I2 was the same as that of the polyester P1 used in C2. The different amounts of butyl glycol resulting from the different solids of dispersions P1 and IR1 were compensated in the formulation I2 by corresponding addition of butyl glycol.

Table 3 shows again the polyesters and reaction products, and their proportions (based on the total amount of the waterborne basecoat materials), used in waterborne basecoat materials C2 and I2, as an overview.

TABLE 3

Compositions of waterborne basecoat materials C2 and I2

| WBM | [wt %] | Polyester/reaction product |
| --- | --- | --- |
| C2 | 10.98 | P1 |
| I2 | 10.98 | IR1 |

Production of Multicoat Paint Systems and Performance Investigation of the Multicoat Paint Systems In analogy to the protocols set out above, corresponding multicoat paint systems (original finishes) were produced using waterborne basecoat materials C2 and I2, and were abraded, and in turn recoated. This was followed in turn by the afore-described investigation of the blistering and swelling.

Table 4 shows the corresponding results.

TABLE 4

Blistering and swelling of multicoat paint systems produced using waterborne basecoat materials C2 and I2

| WBM | Blistering | Swelling | Evaluation |
| --- | --- | --- | --- |
| C2 | m5g4 | none | unsat |
| I2 | m0g0 | none | sat |

Key:
m = number of blisters
g = size of blisters
sat = satisfactory result
unsat = unsatisfactory result The results confirm that when using the reaction products of the invention, blisters no longer occur after condensation-water exposure, and instances of swelling are no longer visible. Furthermore, the properties are a distinct improvement on the use of a standard ester (P1).

The invention claimed is:

1. A dimer fatty acid-polyether-reaction product prepared by reacting:
   (a) one or more dimer fatty acids with
   (b) at least one polyether of formula (I):

   (I)

where R is a $C_3$ to $C_6$ alkylene radical and n is selected such that the at least one polyether (b) possesses a number-average molecular weight of 2250 to 6000 g/mol,
   wherein components (a) and (b) are reacted in a molar ratio of 0.7/2.3 to 1.6/1.7, and wherein the resulting reaction product consists of units of components (a) and (b) and possesses a number-average molecular weight of 4800 to 40000 g/mol and an acid number of less than 10 mg KOH/g.

2. The reaction product as claimed in claim 1, wherein the at least one polyether (b) possesses a number-average molecular weight of 2400 to 5200 g/mol.

3. The reaction product as claimed in claim 1, wherein the group R comprises isopropylene radicals or tetramethylene radicals and the at least one polyether (b) possesses a number-average molecular weight of 2500 to 4800 g/mol.

4. The reaction product as claimed in claim 1, wherein components (a) and (b) are reacted in a molar ratio of 0.9/20.1 to 1.5/1.8.

5. The reaction product as claimed in claim 1, which possesses a number-average molecular weight of 5000 to 30000 g/mol.

6. The reaction product as claimed in claim 1, wherein the one or more dimer fatty acids contain a $C_{36}$ dimer fatty acid.

7. The reaction product as claimed in claim 3, wherein the one or more dimer fatty acids is a $C_{36}$ dimer fatty acid.

8. The reaction product as claimed in claim 7, wherein components (a) and (b) are reacted in a molar ratio of 0.9/20.1 to 1.5/1.8.

9. The reaction product as claimed in claim 1, which possesses a number-average molecular weight of 5500 to 20000 g/mol and an acid number of less than 7.5 mg KOH/g.

10. The reaction product as claimed in claim 8, which possesses a number-average molecular weight of 5500 to 20000 g/mol and an acid number of less than 7.5 mg KOH/g.

11. The reaction product as claimed in claim 1, wherein:
    the one or more dimer fatty acids is a $C_{36}$ dimer fatty acid;
    the at least one polyether is polypropylene glycol or polytetrahydrofuran,
    components (a) and (b) are reacted in a molar ratio of 0.9/20.1 to 1.5/1.8, and
    the reaction product possesses a number-average molecular weight of 5500 to 20000 g/mol and an acid number of less than 7.5 mg KOH/g.

12. The reaction product as claimed in claim 1, wherein radicals between carboxylic acid groups of the one or more dimer fatty acids contain 24 to 44 carbon atoms.

13. The reaction product as claimed in claim 2, wherein radicals between carboxylic acid groups of the one or more dimer fatty acids contain 24 to 44 carbon atoms.

14. The reaction product as claimed in claim 3, wherein radicals between carboxylic acid groups of the one or more dimer fatty acids contain 24 to 44 carbon atoms.

15. The reaction product as claimed in claim 4, wherein radicals between carboxylic acid groups of the one or more dimer fatty acids contain 24 to 44 carbon atoms.

16. The reaction product as claimed in claim 5, wherein radicals between carboxylic acid groups of the one or more dimer fatty acids contain 24 to 44 carbon atoms.

* * * * *

UNITED STATES PATENT AND TRADEMARK OFFICE
CERTIFICATE OF CORRECTION

PATENT NO.         : 10,501,574 B2
APPLICATION NO.    : 14/913141
DATED              : December 10, 2019
INVENTOR(S)        : Bernhard Steinmetz et al.

It is certified that error appears in the above-identified patent and that said Letters Patent is hereby corrected as shown below:

In the Specification

Column 12, Line 51, "number of to 250 mg" should read --number of 0 to 250 mg--;

Column 17, Line 12, "for to 60 minutes" should read --for 1 to 60 minutes--;

Column 19, Line 46, Table A, "Polyurethane modifed" should read --Polyurethane modified--;

Column 21, Line 6, "with ml denoting" should read --with m1 denoting--;

In the Claims

Column 23, Line 35, Claim 4, "0.9/20.1" should read --0.9/2.1--;

Column 24, Line 7, Claim 8, "0.9/20.1" should read --0.9/2.1--;

Column 24, Line 19, Claim 11, "0.9/20.1" should read --0.9/2.1--.

Signed and Sealed this
Nineteenth Day of May, 2020

Andrei Iancu
*Director of the United States Patent and Trademark Office*